(12) United States Patent
Trainin et al.

(10) Patent No.: US 10,602,406 B2
(45) Date of Patent: Mar. 24, 2020

(54) MULTIBAND DATA DELIVERY DEVICE AND METHOD

(71) Applicant: Intel IP Corporation, Santa Clara, CA (US)

(72) Inventors: Solomon Trainin, Haifa (IL); Michael Glik, Kfar Saba (IL); Shani Ben-Haim, Haifa (IL); Izoslav Tchigevsky, Portland, OR (US); Alexander Sirotkin, Petach Tikva (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/064,056

(22) PCT Filed: Dec. 23, 2015

(86) PCT No.: PCT/US2015/000250
§ 371 (c)(1),
(2) Date: Jun. 20, 2018

(87) PCT Pub. No.: WO2017/111778
PCT Pub. Date: Jun. 29, 2017

(65) Prior Publication Data
US 2018/0376374 A1 Dec. 27, 2018

(51) Int. Cl.
*H04W 28/08* (2009.01)
*H04L 1/18* (2006.01)
(Continued)

(52) U.S. Cl.
CPC ......... *H04W 28/085* (2013.01); *H04L 1/0001* (2013.01); *H04L 1/0026* (2013.01);
(Continued)

(58) Field of Classification Search
CPC ............... H04W 28/085; H04W 72/08; H04W 28/0236; H04W 80/02; H04W 72/082;
(Continued)

(56) References Cited

U.S. PATENT DOCUMENTS

2007/0110055 A1 5/2007 Fischer et al.
2009/0019505 A1 1/2009 Gopalakrishnan
(Continued)

FOREIGN PATENT DOCUMENTS

WO 2013126666 A2 8/2013

OTHER PUBLICATIONS

PCT International Search Report issued for PCT/US2015/00250, 3 pgs., dated Mar. 2, 2016.
(Continued)

*Primary Examiner* — Walter J Divito
(74) *Attorney, Agent, or Firm* — Eschweiler & Potashnik, LLC (57) ABSTRACT

In a communication device and communication method, channel quality information for first and the second communication protocols is calculated. Further, allocation information can be generated for the first and the second communication protocols based on the corresponding channel quality information. Sequence numbers of corresponding data frames to be transmitted by the communication device can be generated. Further, the data frames and corresponding sequence numbers can be allocated to the first and the second communication protocols based on the allocation information.

23 Claims, 5 Drawing Sheets

(51) Int. Cl.
*H04L 1/00* (2006.01)
*H04L 1/16* (2006.01)
*H04W 28/02* (2009.01)
*H04W 72/08* (2009.01)
*H04W 80/02* (2009.01)

(52) U.S. Cl.
CPC .......... *H04L 1/1621* (2013.01); *H04L 1/1841* (2013.01); *H04L 1/1874* (2013.01); *H04W 28/0236* (2013.01); *H04W 72/08* (2013.01); *H04L 1/1614* (2013.01); *H04W 72/082* (2013.01); *H04W 80/02* (2013.01)

(58) Field of Classification Search
CPC ... H04L 1/0026; H04L 1/1621; H04L 1/1874; H04L 1/00; H04L 1/1614
See application file for complete search history.

(56) References Cited

U.S. PATENT DOCUMENTS

| | | |
|---|---|---|
| 2012/0084616 A1 | 4/2012 | Wentink |
| 2014/0233407 A1* | 8/2014 | Pourahmadi .......... H04L 5/0007 370/252 |
| 2014/0269461 A1* | 9/2014 | Mehta ...................... H04L 5/06 370/297 |
| 2014/0269491 A1 | 9/2014 | Mehta |
| 2014/0313979 A1 | 10/2014 | Himayat et al. |
| 2017/0064031 A1* | 3/2017 | Sunay ................ H04W 72/082 |

OTHER PUBLICATIONS

Orange Labs; "Collaboration between 2.4/5 and 60GHz" IEEE Draft; Piscataway, NJ; vol. 802.11ad, No. 1; May 5, 2010.
European Search Report dated Jul. 12, 2019 in connection with European Patent Application 15911485.9.

* cited by examiner

MULTIBAND DATA DELIVERY DEVICE AND METHOD

BACKGROUND

Field

Aspects described herein generally relate to multiband wireless communications, including channel aggregation of wireless communication technologies.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
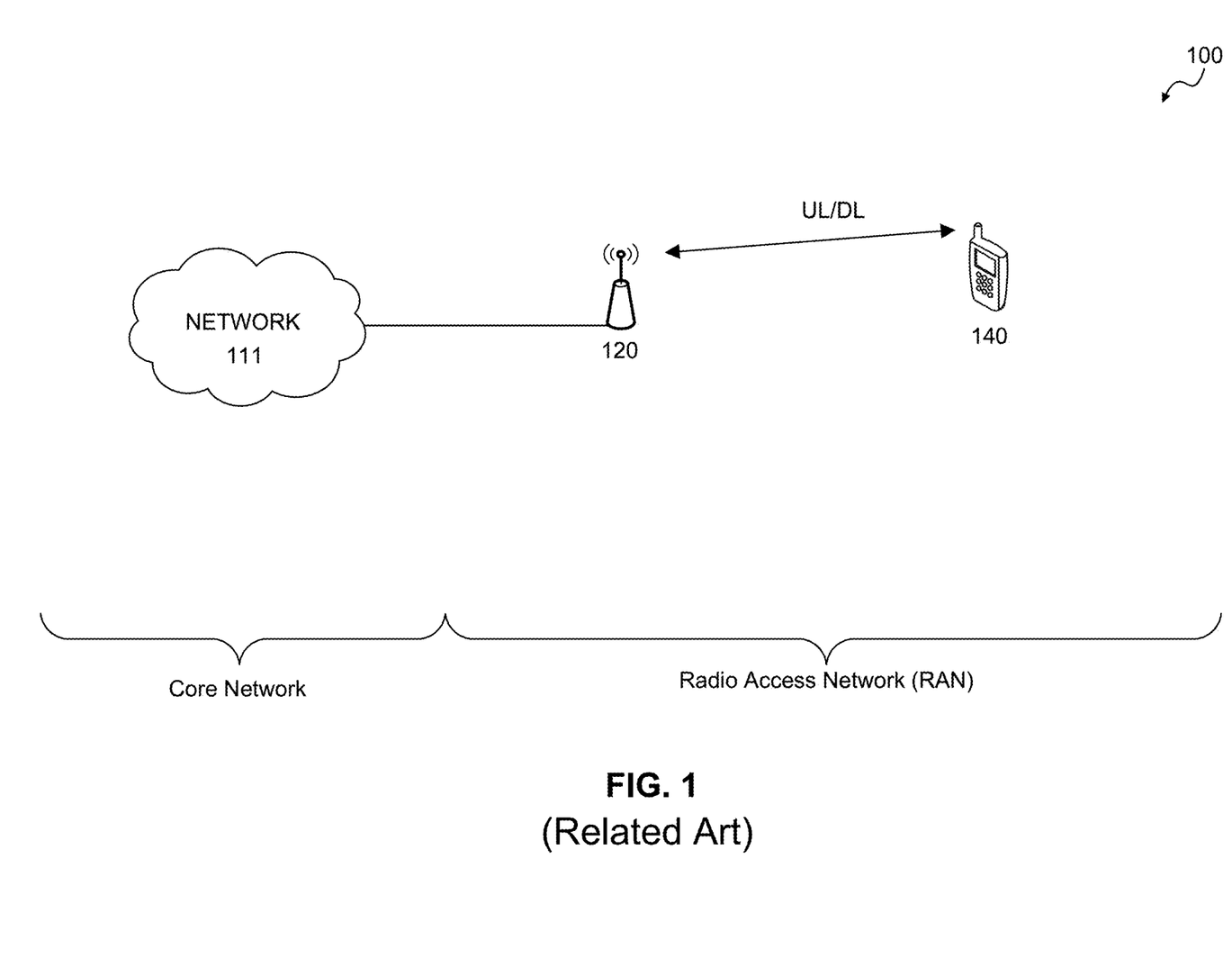
FIG. 1 illustrates an example network environment.

FIG. 1 illustrates an example communication environment 100 that includes a radio access network (RAN) and a core network. The RAN includes two or more wireless communication devices, such as one or more base stations 120 and one or more mobile devices 140. The RAN can include two or more base stations 120, two or more mobile devices 140, or a combination of both as illustrated in FIG. 1.

The core network includes a backhaul communication network 111. In an exemplary aspect, the backhaul communication network 111 can include one or more well-known communication components—such as one or more network switches, one or more network gateways, and/or one or more servers. The backhaul communication network 111 can include one or more devices and/or components configured to exchange data with one or more other devices and/or components via one or more wired and/or wireless communications protocols. In exemplary aspects, the base stations 120 communicate with one or more service providers and/or one or more other base stations 120 via the backhaul communication network 111.

In an exemplary aspect, the backhaul communication network 111 is an internet protocol (IP) backhaul network. The number of base stations 120, mobile devices 140, and/or networks 111 are not limited to the exemplary quantities illustrated in FIG. 1, and the communication environment 100 can include any number of the various components as would be understood by one of ordinary skill in the relevant art(s).

In an exemplary aspect, the base station 120 and mobile device 140 each include processor circuitry that is configured to communicate via one or more wireless technologies. The mobile device 140 can be further configured to support co-existing wireless communications with the base station 120, and/or co-existing wireless communications with the base station 120 and one or more other base stations, where the base station 120 supports one or more wireless communications and the other base station supports one or more other wireless communications.

The mobile device 140 and the base station 120 can each include one or more transceivers configured to transmit and/or receive wireless communications via one or more wireless technologies within the communication environment 100. For example, the mobile device 140 receives signals on one or more downlink (DL) channels from the base stations 120, and transmits signals to the base stations 120 on one or more respective uplink (UL) channels.

Examples of the mobile device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the mobile device 140 may be a stationary device, including, for example, a stationary computing device—such as a personal computer (PC), a desktop computer, a computerized kiosk, and an automotive/aeronautical/maritime in-dash computer terminal.

Examples of the base station 120 include (but are not limited to) a wireless access point, a wireless router, a wireless hotspot, a cell tower, or other wireless transceiver as would be understood by one of ordinary skill in the relevant arts.

Figure 2:
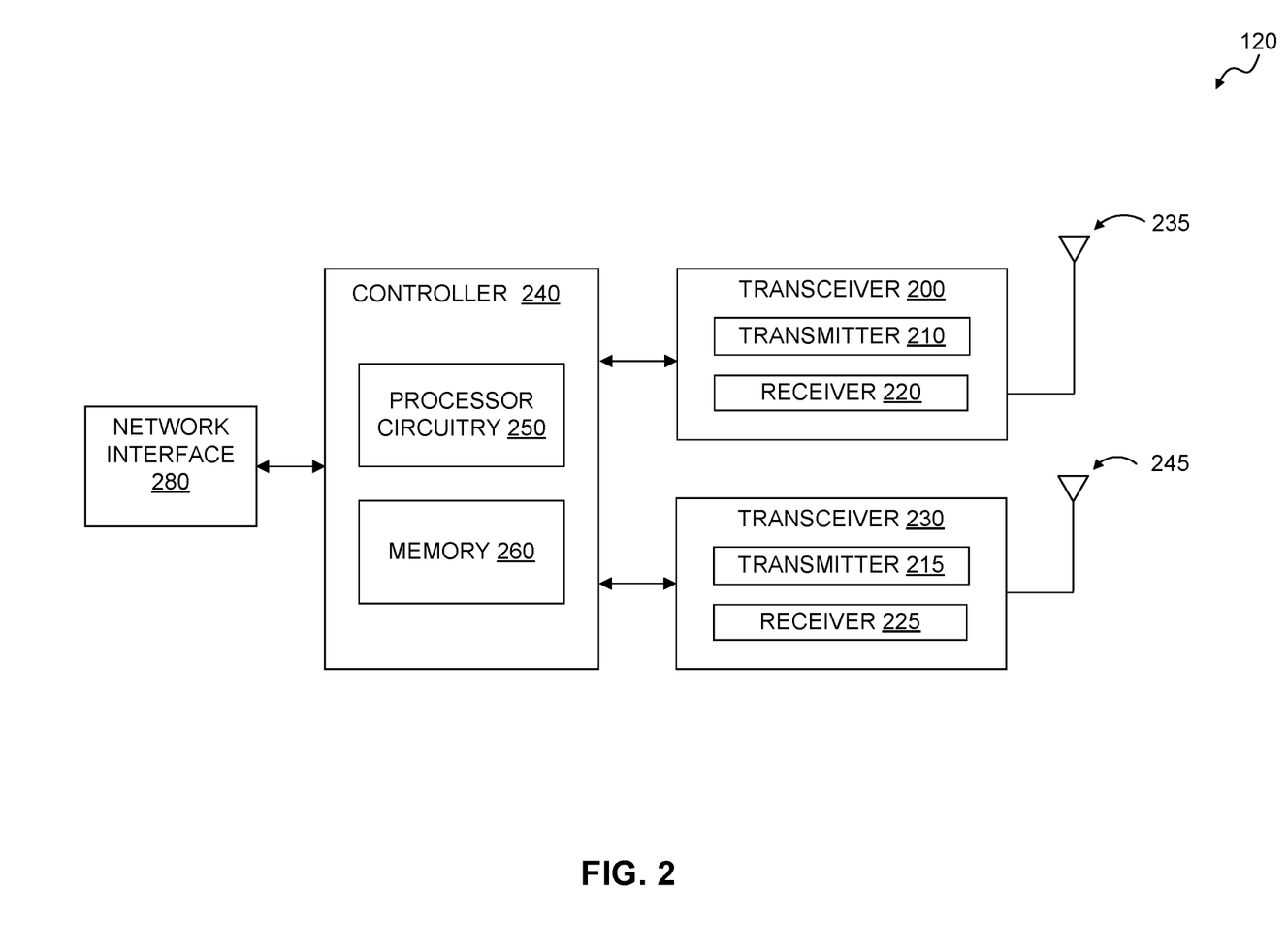
FIG. 2 illustrates a base station according to an exemplary aspect of the present disclosure.

FIG. 2 illustrates the base station 120 according to an exemplary aspect of the present disclosure. For example, the base station 120 can include a network interface 280 and one or more transceivers, each of which are communicatively coupled to controller 240.

In an exemplary aspect, the base station 120 includes a transceiver 200 and a transceiver 230, but is not limited to two transceivers. The transceiver 200 and transceiver 230 can each include processor circuitry that is configured for transmitting and/or receiving wireless communications conforming to one or more wireless protocols.

In an exemplary aspect, the transceivers 200 and 230 can be configured for wireless communications conforming to, for example, one or more of the Institute of Electrical and Electronics Engineers' (IEEE) 802.11 protocols, including (but not limited to) Wi-Fi (e.g., 802.11g, 802.11n, 802.11ac), Wireless Gigabit (WiGig) as defined by IEEE 802.11ad, and/or one or more other 802.11 protocols as would be understood by one of ordinary skill in the art. The IEEE 802.11 protocols are incorporated herein by reference in their entirety. Further, those skilled in the relevant art(s) will understand that the transceiver 200 is not limited to IEEE 802.11 communication protocols, and can be configured for communications that conform to one or more other protocols.

In an exemplary aspect, the transceiver 200 can include a transmitter 210 and receiver 220 that are configured for transmitting and receiving, for example, Wi-Fi communications, respectively, via one or more antennas 235. In this example, the transceiver 200 can be referred to as Wi-Fi transceiver 200. Those skilled in the relevant art(s) will understand that the transceiver 200 is not limited to 802.11 Wi-Fi communications, and can be configured for communications that conform to one or more other protocols in addition (or in the alternative) to the Wi-Fi communications.

The transceiver 230 can include a transmitter 215 and receiver 225 that are configured for transmitting and receiving, for example, WiGig communications, respectively, via one or more antennas 245. In this example, the transceiver 230 can be referred to as WiGig transceiver 230. Those skilled in the relevant art(s) will understand that the transceiver 230 is not limited to WiGig communications, and can be configured for communications that conform to one or more other protocols in addition (or in the alternative) to the WiGig communications.

In an exemplary aspect, the base station 120 can be configured to support co-existing wireless communications (e.g., Wi-Fi and WiGig) with the mobile device(s) 140 and/or one or more other base stations 120.

In one or more exemplary aspects, the transceiver 200 and/or transceiver 230 can include multiple transmitter (Tx) and receiver (Rx) chains, where the various Tx chains and various Rx chains can be configured to different wireless communication protocols. For example, the transceiver 200 could include first and second Tx chains and corresponding first and second Rx chains, where the first Tx/Rx chain pair can be configured for a first communication protocol while the second Tx/Rx chain pair can be configured for a second communication protocol.

In exemplary aspects, the transceiver 200 and/or the transceiver 230 can include (but is not limited to) a digital signal processer (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 235 and/or antenna 245 may include an integer array of antennas, and that the antennas may be capable of both transmitting and receiving wireless communication signals. In some exemplary aspects, the transceivers 200 and 230 can share a common antenna or antenna array.

The network interface 280 includes processor circuitry that is configured to transmit and/or receive communications via one or more wired technologies to/from the backhaul communication network 111. Those skilled in the relevant art(s) will recognize that the network interface 280 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the base station 120 and/or to control the operation of one or more components of the base station 120. The processor circuitry 250 can be configured control the operation of the transceivers 200 and 230—including, for example, transmitting and/or receiving of wireless communications via the transceivers 200/230, and/or perform one or more baseband processing functions (e.g., media access control (MAC), encoding/decoding, modulation/demodulation, data symbol mapping, error correction, etc.). In an exemplary aspect, the controller 240 can include one or more elements of a protocol stack such as, for example, elements of an evolved universal terrestrial radio access network (EUTRAN) protocol—including, for example, physical (PHY) layer, media access control (MAC), radio link control (RLC), packet data convergence protocol (PDCP), and/or radio resource control (RRC) elements. In an exemplary aspect, the MAC is included in the processor circuitry 250 and the PHY layer is included in transceiver 200 and/or transceiver 230.

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

In an exemplary aspect, the base station 120 is configured to negotiate with one or more mobile devices 140 to determine if the mobile device(s) 140 are configured with channel aggregation capabilities, such as those described with reference to FIGS. 4 and 5 below. For example, the base station 120 can perform one or more handshake operations to request that the mobile device(s) 140 respond to the base station 120 with an indication of their channel aggregation capabilities. The handshake operations can include the base station 120 sending a communication to the mobile device(s) 140 requesting that the mobile device(s) 140 respond with whether they are capable of channel aggregation operations, such as those described with reference to FIGS. 4 and 5 below.

Where one or more of the mobile device(s) 140 indicates that it is capable of channel aggregation operations, the base station 120 can be configured to negotiate with the capable mobile device(s) 140 as to whether the mobile device(s) 140 will perform channel aggregation operations with the base station 120. This can include another handshaking operation, where the base station 120 sends a communication to the mobile device(s) 140 requesting that the mobile device(s) 140 respond with whether they will utilize channel aggregation operations, such as those described with reference to FIGS. 4 and 5 below. In an exemplary aspect, the utilization handshake can be performed as an initial operation before a communication session with the mobile device(s) 140 where data is exchanged between the base station 120 and the mobile device(s) 140.

In an exemplary aspect, the two handshaking operations can be performed using a signal handshake operation, where the base station 120 request that the mobile devices 140 indicate their channel aggregation capabilities and whether such capabilities will be used.

Figure 3:
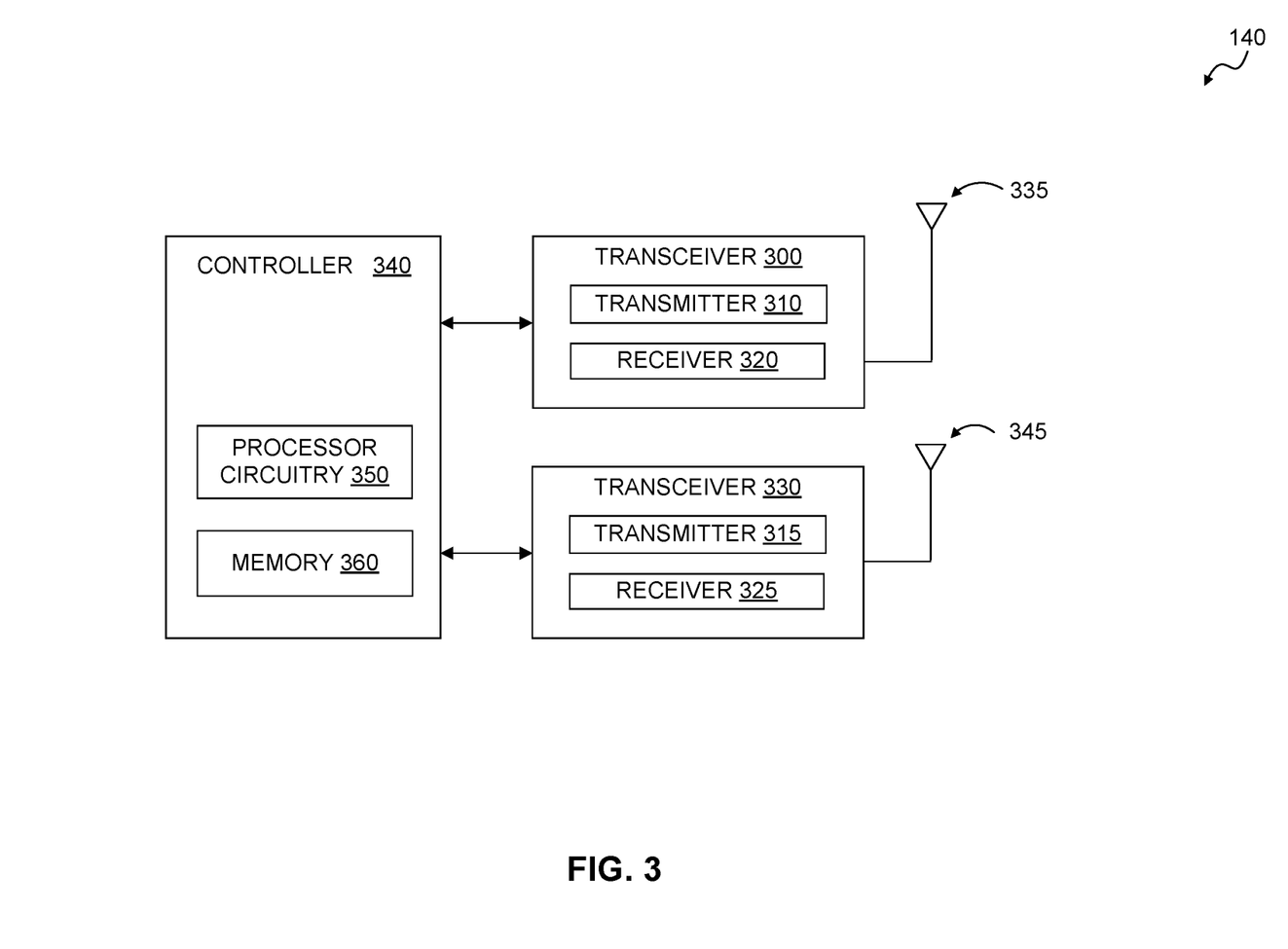
FIG. 3 illustrates a mobile device according to an exemplary aspect of the present disclosure.

FIG. 3 illustrates the mobile device 140 according to an exemplary aspect of the present disclosure. The mobile device 140 can include controller 340 communicatively coupled to one or more transceivers configured to transmit and/or receive wireless communications via one or more wireless technologies within the communication environment 100. In an exemplary aspect, the mobile device 140 includes a transceiver 300 and a transceiver 330, but is not limited to two transceivers.

The transceiver 300 and transceiver 330 can each include processor circuitry that is configured for transmitting and/or receiving wireless communications conforming to one or more wireless protocols. For example, the transceiver 300 can include a transmitter 310 and receiver 320 that are configured for transmitting and receiving, for example, Wi-Fi communications, respectively, via one or more antennas 335. In this example, the transceiver 300 can be referred to as Wi-Fi transceiver 300. Those skilled in the relevant art(s) will understand that the transceiver 300 is not limited to 802.11 Wi-Fi communications, and can be configured for communications that conform to one or more other protocols in addition (or in the alternative) to the Wi-Fi communications.

The transceiver 330 can include a transmitter 315 and receiver 325 that are configured for transmitting and receiving, for example, WiGig communications, respectively, via one or more antennas 345. In this example, the transceiver 330 can be referred to as WiGig transceiver 330. Those skilled in the relevant art(s) will understand that the transceiver 300 is not limited to WiGig communications, and can be configured for communications that conform to one or more other protocols in addition (or in the alternative) to the WiGig communications.

In an exemplary aspect, the mobile device 140 can be configured to support co-existing wireless communications (e.g., Wi-Fi and WiGig) with one or more of the base stations 120.

In one or more exemplary aspects, the transceiver 300 and/or transceiver 330 can include multiple transmitter (Tx) and receiver (Rx) chains, where the various Tx chains and various Rx chains can be configured to different wireless communication protocols. For example, the transceiver 200 could include first and second Tx chains and corresponding first and second Rx chains, where the first Tx/Rx chain pair can be configured for a first communication protocol while the second Tx/Rx chain pair can be configured for a second communication protocol.

In exemplary aspects, the transceiver 300 and/or the transceiver 330 can include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 335 and/or antenna 345 may include an integer array of antennas, and that the antennas may be capable of both transmitting and receiving wireless communication signals. In some exemplary aspects, the transceivers 300 and 330 can share a common antenna or antenna array.

The controller 340 can include processor circuitry 350 that is configured to control the overall operation of the mobile device 140, such as the operation of the transceiver 300—including, for example, transmitting and/or receiving of wireless communications via the transceiver 300, and/or perform one or more baseband processing functions (e.g., media access control (MAC), encoding/decoding, modulation/demodulation, data symbol mapping, error correction, etc.); the running of one or more applications and/or operating systems; power management (e.g., battery control and monitoring); display settings; volume control; and/or user interactions via one or more user interfaces (e.g., keyboard, touchscreen display, microphone, speaker, etc.).

In an exemplary aspect, the controller 340 can include one or more elements of a protocol stack such as physical (PHY) layer, media access control (MAC), radio link control (RLC), packet data convergence protocol (PDCP), and/or radio resource control (RRC) elements. In an exemplary aspect, the MAC is included in the processor circuitry 350 and the PHY layer is included in transceiver 300 and/or transceiver 330.

The controller 340 can further include a memory 360 that stores data and/or instructions, where when the instructions are executed by the processor circuitry 350, controls the processor circuitry 350 to perform the functions described herein. The memory 360 can be any well-known volatile and/or non-volatile memory, and can be non-removable, removable, or a combination of both.

In an exemplary aspect, the mobile device 140 is configured to negotiate with one or more base stations 120 to determine if the base station(s) 120 are configured with channel aggregation capabilities, such as those described with reference to FIGS. 4 and 5 below. For example, the mobile device 140 can perform one or more handshake operations to request that the base station(s) 120 respond to the mobile device 140 with an indication of their channel aggregation capabilities. The handshake operations can include the mobile device 140 sending a communication to the base station(s) 120 requesting that the base station(s) 120 respond with whether they are capable of channel aggregation operations, such as those described with reference to FIGS. 4 and 5 below.

Where one or more of the base station(s) 120 indicates that it is capable of channel aggregation operations, the mobile device 140 can be configured to negotiate with the capable base station(s) 120 as to whether the base station(s) 120 will perform channel aggregation operations with the mobile device 140. This can include another handshaking operation, where the mobile device 140 sends a communication to the base station(s) 120 requesting that the base station(s) 120 respond with whether they will utilize channel aggregation operations, such as those described with reference to FIGS. 4 and 5 below. In an exemplary aspect, the utilization handshake can be performed as an initial operation before a communication session with the base station(s) 120 where data is exchanged between the mobile device 140 and the base station(s) 120.

In an exemplary aspect, the two handshaking operations can be performed using a signal handshake operation where the mobile device 140 request that the base station(s) 120 indicate their channel aggregation capabilities and whether such capabilities will be used.

Figure 4:
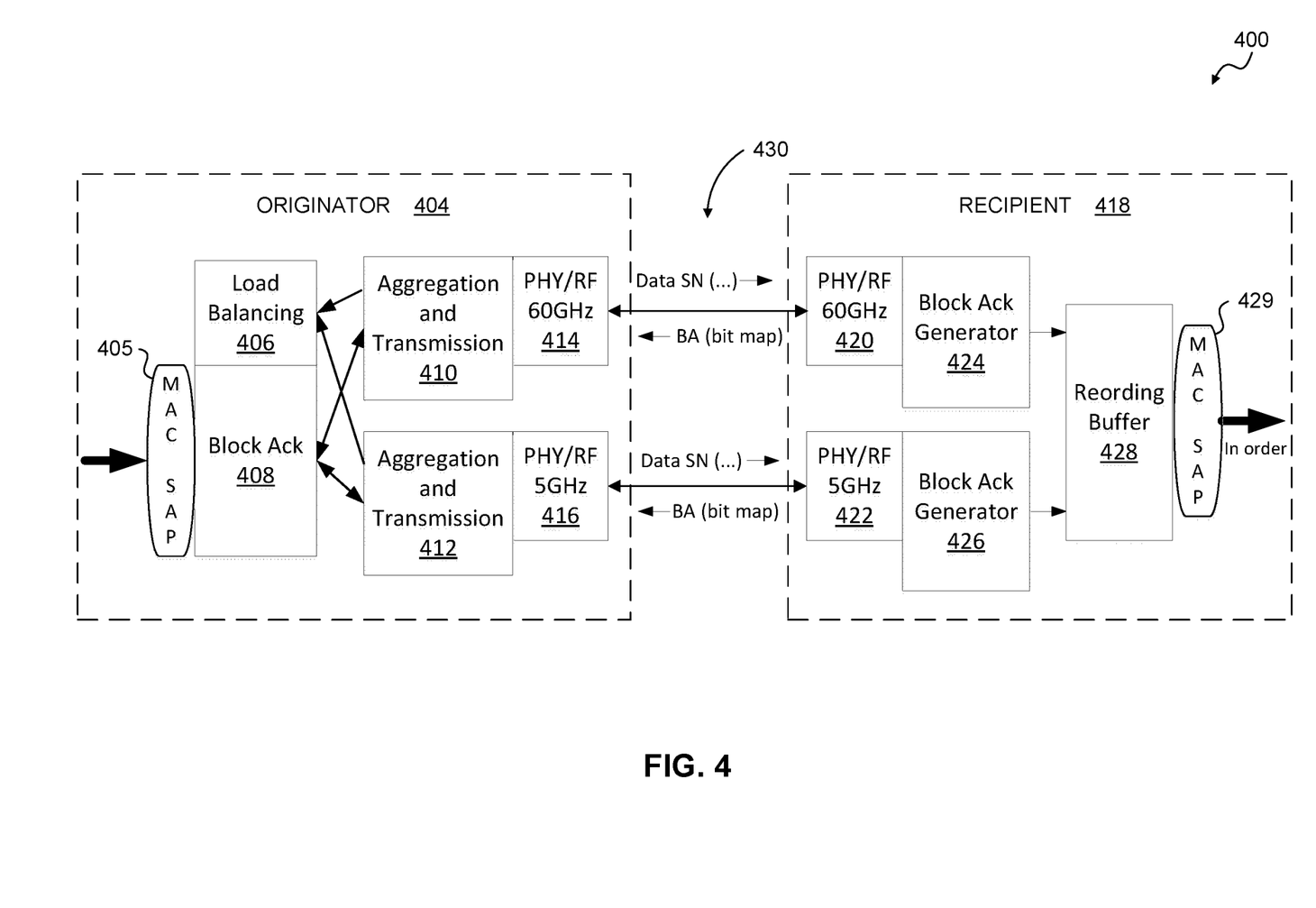
FIG. 4 illustrates a communication system architecture according to an exemplary aspect of the present disclosure.

FIG. 4 illustrates a communication system architecture 400 according to an exemplary aspect of the present disclosure. In exemplary aspects, the communication system architecture 400 illustrates an exemplary upload operation from the mobile device 140 to the base station 120, or a download operation from the base station 120 to the mobile device 140. For example, in an upload operation, the originator 404 represents the mobile device 140 and the recipient 418 represents the base station 120. Conversely, in a download operation, the originator 404 represents the base station 120 and the recipient 418 represents the mobile device 140. In an exemplary aspect, the communication system architecture 400 is configured to wirelessly communicate using the Wi-Fi (e.g., 2.5/5 GHz) and WiGig (60 GHz) protocols, but is not limited thereto.

In an exemplary aspect, the originator 404 is communicatively coupled to the recipient 418 via a communication channel 430. The originator 404 includes a media access control (MAC) service access point (SAP) 405, a load balancing module 406, a block acknowledgment module 408, first and second aggregation and transmission modules 410 and 412, and first and second radio frequency (RF) circuits 414 and 416. The recipient 418 includes first and second RF circuits 420 and 422, first and second block acknowledgment generators 424 and 426, reordering buffer 428 and MAC SAP 429.

In an exemplary aspect, the MAC SAP 405, load balancing module 406, block acknowledgment module 408, and first and second aggregation and transmission modules 410 and 412 can be included in (i.e., components of) the controller 240/340 of the respective originating device. Further, in an exemplary aspect, the MAC SAP 405, load balancing module 406, block acknowledgment module 408, and first and second aggregation and transmission modules 410 and 412 are components of the MAC, which can be included in the respective controller 240/340, and in some exemplary aspects, within the corresponding processor circuitry 250/350. The RF circuits 414 and 416 can be included in (i.e., components of) the transceivers 200,230/300,330 of the respective originating device.

Similarly, the RF circuits 420 and 422 can be included in (i.e., components of) the transceivers 200,230/300,330 of the respective recipient device. The block acknowledgment generators 424 and 426, reordering buffer 428 and MAC SAP 429 can be included in (i.e., components of) the controller 240/340 of the respective recipient device. Further, in an exemplary aspect, the block acknowledgment generators 424 and 426, reordering buffer 428 and MAC SAP 429 are components of the MAC, which can be included in the respective controller 240/340, and in some exemplary aspects, within the corresponding processor circuitry 250/350.

The MAC SAP 405 can be configured to receive data (e.g., from one or more upper layers of the protocol stack) to be transmitted, and to provide the received data to the load balancing module 406 and/or the block acknowledgment module 408.

The load balancing module 406 can be configured to calculate channel quality information for one or more communication protocols and to generate allocation information for the communication protocol(s) based on the channel quality information. The channel quality information is information that indicates the quality of the communication channel 430, and can include, for example, load of the channel, accessibility/availability of the channel, link quality of the channel, signal strength of signals received via the channel, statistics of data delivery success, and/or other channel quality metrics as would be understood by one of ordinary skill in the art.

The allocation information can include instructions for the allocation of data frames to be transmitted by the originator 404 via the various communication protocols. In an exemplary aspect, the allocation information can identify the proportions/percentages of the data frames to be transmitted via a first communication protocol (e.g., Wi-Fi) and the second communication protocol (e.g., WiGig). For example, as described in detail below, the allocation information can instruct the block acknowledgement module 408 to allocate a first percentage (e.g., 25%) of data frames to the first communication protocol and a second percentage (75%) of the data frames to second communication protocol. In this regard, the allocation information can represent the allocation ratio of the data frames for the communication protocols. In an exemplary aspect, the data frames are Media Access Control Protocol Data Units (MPDUs).

The block acknowledgement module 408 can be configured to generate sequence numbers of corresponding data frames and to allocate the data frames and corresponding sequence numbers to the corresponding communication protocols based on the allocation information received from the load balancing module 406. In operation, the block acknowledgement module 408 associates the generated sequence numbers with corresponding data frames to be transmitted. The block acknowledgement module 408 then allocates the sequence numbers and their corresponding data frames to a particular communication protocol to be used to transmit the corresponding data frames. This allocation is based on the allocation information generated by the load balancing module 406. In this regards, the load balancing module 406 determines the percentage of data frames to be transmitted per communication protocol while the block acknowledgement module 408 determines which particular data frames are to be transmitted by each of the communication protocols. For example, the block acknowledgement module 408 directs data frames having corresponding sequence numbers to either the aggregation and transmission module 410 for transmission using the WiGig protocol or to the aggregation and transmission module 412 for transmission using the Wi-Fi protocol.

The aggregation and transmission modules 410 and 412 can each be configured to receive data frames from the block acknowledgement module 408 and to aggregate two or more received frames together to generate a corresponding aggregated frame. In an exemplary aspect, the data frames are Media Access Control Protocol Data Units (MPDUs) and the aggregation and transmission modules 410 and 412 can aggregate two or more MPDUs together to form a corresponding Aggregated MPDU (A-MPDU). In an exemplary aspect, the aggregation and transmission modules 410 and 412 are configured to aggregate the data frames based on one or more block acknowledgment rules and/or A-MPDU rules.

The aggregation and transmission modules 410 and 412 can then transmit the aggregated frame(s) (e.g., the A-MPDUs) via their corresponding RF circuits 414 and 416, respectively. For example, the aggregation and transmission module 410 can transmit its aggregated data frames to the recipient 418 via the WiGig protocol using its corresponding RF circuit 414. Similarly, the aggregation and transmission module 412 can transmit its aggregated data frames to the recipient 418 via the Wi-Fi protocol using its corresponding RF circuit 416.

The load balancing module 406 can also be configured to receive one or more block acknowledgements (BA) via the communication channel 430. In operation, the block acknowledgements acknowledge which data frames transmitted by the originator 404 have been received successfully by the recipient 418. As described in detail below, the block acknowledgment generators 424 and 426 generate the block acknowledgements that are received by the load balancing module 406.

Upon receipt of one of more block acknowledgments, the load balancing module 406 adjusts the generate allocation information based on the received block acknowledgements to generate adjusted allocation information. In this regards, the load balancing module 406 is configured to adjust the allocation information based on the received block acknowledgments. In operation, the load balancing module 406 then provides the adjusted allocation information to the block acknowledgement module 408, which can reallocate one or more of the data frames and corresponding sequence numbers to a different aggregation and transmission module 410, 412 to be transmitted by a different communication protocol than previously used.

For example, the load balancing module 406 can receive a block acknowledgment that indicates that a significant amount of the data frames transmitted by the aggregation and transmission module 410 using the WiGig protocol were unsuccessfully received by the recipient 418 (or that the channel quality for the WiGig protocol is unsatisfactory), the load balancing module 406 can adjust the allocation information to instruct an allocation by the block acknowledgement module 408 of a larger percentage of the data frames to the aggregation and transmission module 412 to be transmitted using the Wi-Fi protocol.

The block acknowledgment generators 424 and 426 are each configured to receive aggregated data frames (e.g., A-MDPUs) from the originator 404 using corresponding RF circuits 420 and 422. In an exemplary aspect, each of the RF circuits 414, 416, 420, and 422 include processor circuitry configured to transmit and/or receive wireless communications via one or more wireless technologies.

The block acknowledgment generators 424 and 426 can be configured to generate one or more block acknowledgements corresponding to received aggregated data frames. In an exemplary aspect, each of the block acknowledgments includes a bitmap whose bits correspond to the data frames integrated within the corresponding aggregated data frame. For example, if an aggregated data frame consists of 10 data frames (i.e., subframes), the block acknowledgment generator 424, 426 can generate a block acknowledgement including a 10-bit bitmap, where each bit corresponds to a respective data frame within the aggregated data frame. In this example, if the bitmap is 0000011111, the block acknowledgment would indicate that data frames 0-4 (i.e., the first 5 data frames) of the aggregated data frame were unsuccessfully received while the data frames 5-9 where successfully received. The block acknowledgment generators 424 and 426 can then transmit the block acknowledgments to the originator 404 as discussed above.

The block acknowledgment generators 424 and 426 can also be configured to de-aggregate the received aggregated data frames to obtain the data frames that were successfully received by the recipient 418. The block acknowledgment generators 424 and 426 can then provide the data frames to the reordering buffer 428 for further processing.

The reordering buffer 428 can be configured to receive the data frames from the block acknowledgment generators 424 and 426 and to reorder the data frames based on their corresponding sequence numbers (SN). In an exemplary aspect, the reordering buffer 428 is configured to release the data frames in sequence number order to one or more higher layers via the MAC SAP 429. For example, if the reordering buffer 428 receives data frames having sequence numbers 4, 2, and 3, the reordering buffer 428 will recorder the data frames in sequence number order (e.g., 2, 3, 4) and buffer the data frames until data frame (SN=1) is received. In operation, the reordering buffer 428 releases the data frames in sequence number order. Therefore, upon receiving data frame (SN=1), the reordering buffer 428 will reorder the data frames in sequence number order (SN=1, 2, 3, 4), then release the four data frames in sequence number order.

Figure 5:
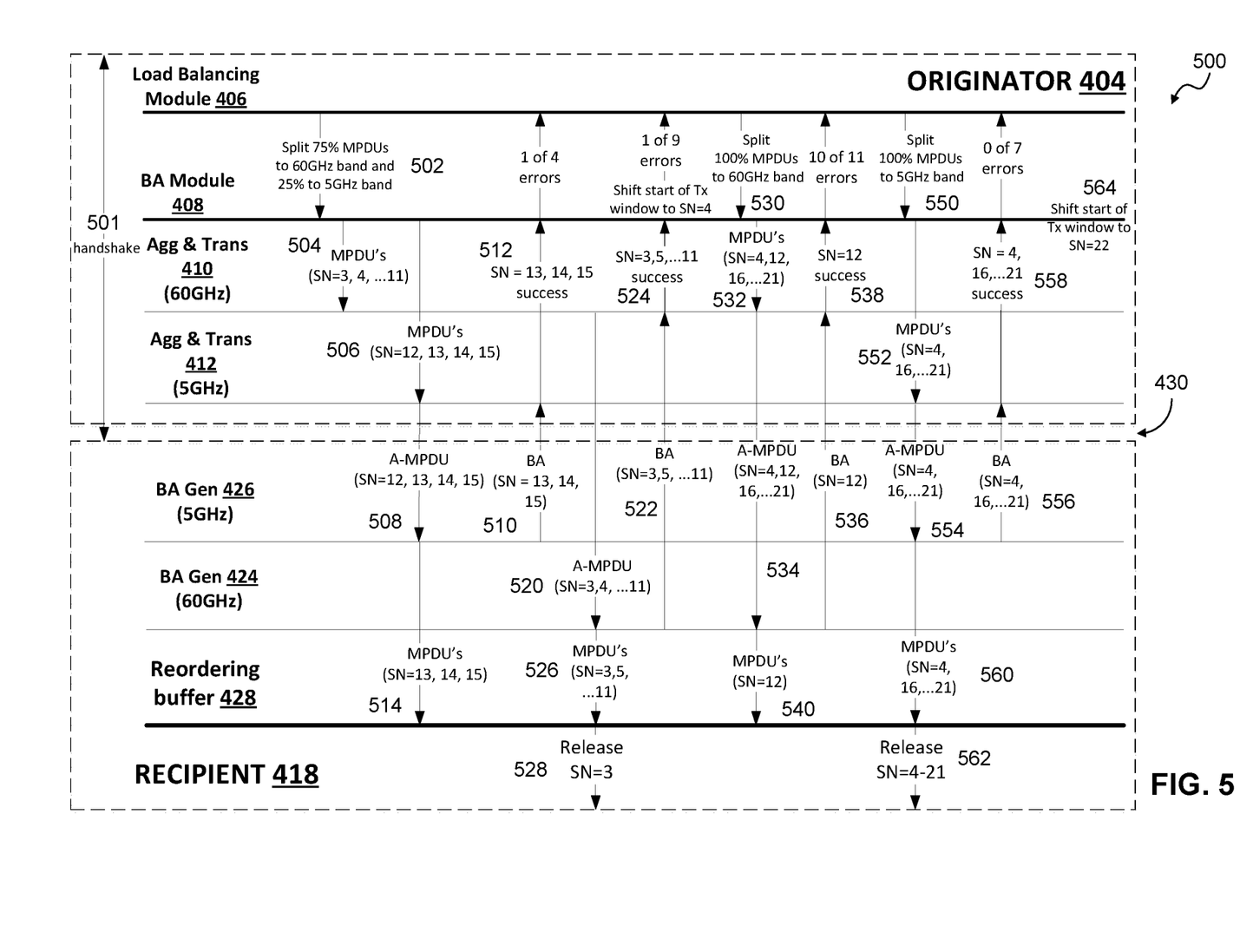
FIG. 5 illustrates a communication method according to an exemplary aspect of the present disclosure.

FIG. 5 illustrates a communication method (e.g., a multiband data delivery method) 500 according to an exemplary aspect of the present disclosure. The flowchart is described with continued reference to FIGS. 1-4. The steps of the method are not limited to the order described below, and the various steps may be performed in a different order. Further, two or more steps of the method may be performed simultaneously with each other.

The method of flowchart 500 begins at step 501, where one or more handshake operations are performed between the originator 404 and the recipient 418. The one or more handshake operations can be used to determine whether the recipient 418 is capable of channel aggregation operations and whether such channel aggregation operations will be used for the communication session. For example, the originator 404 can negotiate with the recipient 418 to request that the recipient 418 respond to the originator 404 with an indication of the recipient's 418 channel aggregation capabilities. The handshake can also include a request for the recipient 418 to respond to the originator 404 confirming whether channel aggregation operations will be used in the communication session. The requests can be included in a single handshake, or in multiple handshakes. For the purpose of this exemplary method, it is assumed that the recipient 418 has confirmed that it is both capable of channel aggregation operations and that channel aggregation operations will be used in the communication session with the originator 404.

After step 501, the flowchart 500 transitions to step 502, where channel quality information is calculated and the allocation information is generated based on the channel quality information. The allocation information is then provided to the block acknowledgment module 408.

For example, the load balancing module 406 can calculate channel quality information for one or more communication protocols and to generate allocation information for the communication protocol(s) based on the channel quality information. The allocation information can identify the proportions/percentages of the data frames to be transmitted via a first communication protocol (e.g., Wi-Fi) and the second communication protocol (e.g., WiGig). In this example, the allocation information instructs the block acknowledgement module 408 to allocate 25% of data frames to the Wi-Fi protocol (e.g., 5 GHz band) and 75% of the data frames to the WiGig protocol (e.g., 60 GHz).

After step 502, the flowchart 500 transitions to steps 504 and 506, where sequence numbers are generated for corresponding data frames and the data frames are allocated to the aggregation and transmission modules 410 and 412.

For example, the block acknowledgment module 408 can allocate particular data frames to the aggregation and transmission module 410 and other data frames to the aggregation and transmission module 412 based on the allocation information provided by the load balancing module 406. In this example, MPDUs (SN=3, 4, . . . 11) are allocated to the aggregation and transmission module 410 (step 504) for transmission via the WiGig protocol and MPDUs (SN=12, 13, 14, 15) are allocated to the aggregation and transmission module 412 for transmission via the Wi-Fi protocol. Steps 504 and 506 may be performed at different times or simultaneously.

After steps 504 and 506, the flowchart 500 transitions to step 508, where data frames are aggregated and transmitted to the recipient 418 via the corresponding wireless communication protocol.

For example, the aggregation and transmission module 412 can aggregate MPDUs (SN=12, 13, 14, 15) to generate A-MPDU (SN=12, 13, 14, 15), and to transmit A-MPDU (SN=12, 13, 14, 15) to the block acknowledgment generator 426 of the recipient 418 via the Wi-Fi protocol.

After step 508, the flowchart 500 transitions to step 510, where block acknowledgments (BA) are generated corresponding to the received aggregated data frames (e.g., A-MPDU (SN=12, 13, 14, 15)) and transmitted to the originator 404.

For example, the block acknowledgment generator 426 can generate a block acknowledgment (BA), and transmit the block acknowledgment to the block aggregation and transmission module 412 of the originator 404 via the Wi-Fi protocol. In this example, the block acknowledgment indicates that MPDUs (SN=13, 14, 15) were successfully received by the block acknowledgment generator 426 and that MPDU (SN=12) was unsuccessful. That is, the transmission included one of four errors.

After step 510, the flowchart 500 transitions to step 512, where the received block acknowledgment is provided to the load balancing module 406.

For example, the aggregation and transmission module 412 can provide the received block acknowledgment (e.g., MPDUs (SN=13, 14, 15)) to the load balancing module 406.

After step 512, the flowchart 500 transitions to step 514, where the received aggregated data frame (e.g., A-MPDU (SN=12, 13, 14, 15)) is de-aggregated and provided to the reordering buffer 428. For example, block acknowledgment generator 426 can de-aggregate the aggregated data frame (e.g., A-MPDU (SN=12, 13, 14, 15)) and provide the de-aggregated date frame (e.g., MPDU (SN=13, 14, 15)) to the reordering buffer 428. In an exemplary aspect, the block acknowledgments can be generated and immediately transmitted back to the originator 408 in response to the received aggregated data frame. This sequences illustrated in FIG. 5. However, in some exemplary aspects, the de-aggregated data frames can be provided to the reordering buffer 428 by the block acknowledgment generator 426 following receipt of the aggregated data frame by the block acknowledgment generator 426 and before the block acknowledgment generator 426 generates and transmits a block acknowledgment to the originator 404. That is, the flowchart illustrated in FIG. 5 could be performed in the sequence of steps 508, 514, 510, and 512.

After step 514, the flowchart 500 transitions to step 520, where data frames are aggregated and transmitted to the recipient 418 via the corresponding wireless communication protocol.

For example, the aggregation and transmission module 410 can aggregate MPDUs (SN=3, 4 . . . 11) to generate A-MPDU (SN=3, 4 . . . 11), and to transmit A-MPDU (SN=3, 4 . . . 11) to the block acknowledgment generator 424 of the recipient 418 via the WiGig protocol.

After step 520, the flowchart 500 transitions to step 522, where block acknowledgments (BA) are generated corresponding to the received aggregated data frames (e.g., A-MPDU (SN=3, 4 . . . 11)) and transmitted to the originator 404.

For example, the block acknowledgment generator 424 can generate a block acknowledgment (BA), and transmit the block acknowledgment to the block aggregation and transmission module 410 of the originator 404 via the WiGig protocol. In this example, the block acknowledgment indicates that MPDUs (SN=3, 5 . . . 11) were successfully received by the block acknowledgment generator 424 and that MPDU (SN=4) was unsuccessful. That is, the transmission included one of nine errors.

After step 522, the flowchart 500 transitions to step 524, where the received block acknowledgment is provided to the load balancing module 406.

For example, the aggregation and transmission module 410 can provide the received block acknowledgment (e.g., MPDUs (SN=3, 5 . . . 11)) to the load balancing module 406.

After step 524, the flowchart 500 transitions to step 526, where the received aggregated data frame (e.g., A-MPDU (SN=3, 4 . . . 11)) is de-aggregated and provided to the reordering buffer 428. For example, block acknowledgment generator 424 can de-aggregate the aggregated data frame (e.g., A-MPDU (SN=3, 4 . . . 11)) and provide the de-aggregated date frame (e.g., MPDU (SN=3, 5 . . . 11)) to the reordering buffer 428. Again, in an exemplary aspect, the block acknowledgments can be generated and immediately transmitted back to the originator 408 in response to the received aggregated data frame. This sequences illustrated in FIG. 5. However, in some exemplary aspects, the de-aggregated data frames can be provided to the reordering buffer 428 by the block acknowledgment generator 424 following receipt of the aggregated data frame by the block acknowledgment generator 424 and before the block acknowledgment generator 424 generates and transmits a block acknowledgment to the originator 404. That is, the flowchart illustrated in FIG. 5 could be performed in the sequence of steps 520, 526, 522, and 524.

After step 526, the flowchart 500 transitions to step 528, where the data frame(s) are released in sequence order. For example, the reordering buffer 428 can release the data frame(s) in sequence number order to one or more higher layers via the MAC SAP 429. In this example, because data frame (SN=4) was not successfully received, the data frames (SN=5, 6 . . . 11) are buffered and held in the reordering buffer 428. Data frame (SN=3) is released by the reordering buffer 428.

After step 528, the flowchart 500 transitions to step 530, where the generated allocation information is adjusted based on one or more block acknowledgements to generate adjusted allocation information. Further, the start of the transmission window is shifted to the sequence number (SN=4).

For example, the load balancing module 406 can receive the block acknowledgments (steps 512, 524) and can adjust the previously generated allocation information based on the received block acknowledgments to generate adjusted allocation information. In this example, the adjusted allocation information instructs the block acknowledgement module 408 to allocate 0% of data frames to the Wi-Fi protocol (e.g., 5 GHz band) and 100% of the data frames to the WiGig protocol (e.g., 60 GHz).

After step 530, the flowchart 500 transitions to step 532, where sequence numbers are generated for a new set of data frames to be transmitted (e.g., 16 to 21) and the old data frames (4, 12) and the new data frames (16 to 21) are allocated to the aggregation and transmission module 410.

After step 532, the flowchart 500 transitions to step 534, where data frames are aggregated and transmitted to the recipient 418 via the WiGig wireless communication protocol.

For example, the aggregation and transmission module 410 can aggregate MPDUs (SN=4, 12, 16 . . . 21) to generate A-MPDU (SN=4, 12, 16 . . . 21), and to transmit A-MPDU (SN=4, 12, 16 . . . 21) to the block acknowledgment generator 424 of the recipient 418 via the WiGig protocol.

After step 534, the flowchart 500 transitions to step 536, where block acknowledgments (BA) are generated corresponding to the received aggregated data frames (e.g., A-MPDU (SN=4, 12, 16 . . . 21)) and transmitted to the originator 404.

For example, the block acknowledgment generator 424 can generate a block acknowledgment (BA), and transmit the block acknowledgment to the block aggregation and transmission module 410 of the originator 404 via the WiGig protocol. In this example, the block acknowledgment indicates that only MPDU (SN=12) was successfully received by the block acknowledgment generator 424 and that MPDUs (SN=4, 16 . . . 21) were unsuccessful. That is, the transmission included 10 of 11 errors.

After step 536, the flowchart 500 transitions to step 538, where the received block acknowledgment is provided to the load balancing module 406.

For example, the aggregation and transmission module 410 can provide the received block acknowledgment (e.g., MPDU (SN=12)) to the load balancing module 406.

After step 538, the flowchart 500 transitions to step 540, where the received aggregated data frame (e.g., A-MPDU (SN=4, 12, 16 . . . 21)) is de-aggregated and provided to the reordering buffer 428. For example, block acknowledgment generator 424 can de-aggregate the aggregated data frame (e.g., A-MPDU (SN=4, 12, 16 . . . 21)) and provide the de-aggregated date frame (e.g., MPDU (SN=12)) to the reordering buffer 428. Again, in an exemplary aspect, the block acknowledgments can be generated and immediately transmitted back to the originator 408 in response to the received aggregated data frame. This sequences illustrated in FIG. 5. However, in some exemplary aspects, the de-aggregated data frames can be provided to the reordering buffer 428 by the block acknowledgment generator 424 following receipt of the aggregated data frame by the block acknowledgment generator 424 and before the block acknowledgment generator 424 generates and transmits a block acknowledgment to the originator 404. That is, the flowchart illustrated in FIG. 5 could be performed in the sequence of steps 534, 540, 536, and 538. Further, as illustrated, the MPDU (SN=12) is not released by the reordering buffer 428 because the proceeding data frame (e.g., MPDU (SN=4)) was not successfully received and available to be released.

After step 540, the flowchart 500 transitions to step 550, where the generated allocation information is adjusted based on one or more block acknowledgements to generate adjusted allocation information.

For example, the load balancing module 406 can receive the block acknowledgment (steps 538) and can adjust the previously adjusted allocation information based on the received block acknowledgment to generate new adjusted allocation information. In this example, the new adjusted allocation information instructs the block acknowledgement module 408 to allocate 100% of data frames to the Wi-Fi protocol (e.g., 5 GHz band) and 0% of the data frames to the WiGig protocol (e.g., 60 GHz).

After step 550, the flowchart 500 transitions to step 552, where the sequence numbers are allocated to the aggregation and transmission module 412.

After step 552, the flowchart 500 transitions to step 554, where data frames are aggregated and transmitted to the recipient 418 via the Wi-Fi wireless communication protocol.

For example, the aggregation and transmission module 412 can aggregate MPDUs (SN=4, 16 . . . 21) to generate A-MPDU (SN=4, 16 . . . 21), and to transmit A-MPDU (SN=4, 16 . . . 21) to the block acknowledgment generator 426 of the recipient 418 via the Wi-Fi protocol.

After step 554, the flowchart 500 transitions to step 556, where block acknowledgment (BA) is generated corresponding to the received aggregated data frames (e.g., A-MPDU (SN=4, 16 . . . 21)) and transmitted to the originator 404.

For example, the block acknowledgment generator 426 can generate a block acknowledgment (BA), and transmit the block acknowledgment to the block aggregation and transmission module 412 of the originator 404 via the Wi-Fi protocol. In this example, the block acknowledgment indicates that all data frames MPDU (SN=4, 16 . . . 21) were successfully received by the block acknowledgment generator 426. That is, the transmission included zero of seven errors.

After step 556, the flowchart 500 transitions to step 558, where the received block acknowledgment is provided to the load balancing module 406.

For example, the aggregation and transmission module 412 can provide the received block acknowledgment (e.g., MPDU (SN=4, 16 . . . 21)) to the load balancing module 406.

After step 558, the flowchart 500 transitions to step 560, where the received aggregated data frame (e.g., A-MPDU (SN=4, 16 . . . 21)) is de-aggregated and provided to the reordering buffer 428. For example, block acknowledgment generator 426 can de-aggregate the aggregated data frame (e.g., A-MPDU (SN=4, 16 . . . 21)) and provide the de-aggregated date frame (e.g., MPDU (4, 16 . . . 21)) to the reordering buffer 428.

After step 560, the flowchart 500 transitions to step 562, where the data frame(s) are released in sequence order. For example, the reordering buffer 428 can release the data frame(s) in sequence number order to one or more higher layers via the MAC SAP 429. In this example, because all data frames were successfully received, all of the data frames (SN=4, 16 . . . 21) are released by the reordering buffer 428 in sequence order (e.g., 4, 16 . . . 21).

After step 562, the flowchart 500 transitions to step 564, where the start of the transmission window is shifted to the sequence number (SN=22).

After step 564, the method illustrated in flowchart 500 can be repeated for subsequence data frames (e.g., SN=22), or flowchart can be terminated if no other data frames are to be transmitted.

Examples

Example 1 is a communication device operable to communicate using first and second communication protocols, comprising: a load balancing module configured to: calculate channel quality information for each of the first and the second communication protocols; and generate allocation information of the first and the second communication protocols based on the corresponding channel quality information; and a block acknowledgement module configured to: generate sequence numbers of corresponding data frames; allocate the data frames and corresponding sequence numbers to first and second aggregation and transmission modules corresponding to the first and the second communication protocols based on the allocation information.

In Example 2, the subject matter of Example 1, wherein the load balancing module is further configured to receive a block acknowledgement that acknowledges which of the data frames have been successfully transmitted to another communication device.

In Example 3, the subject matter of Example 2, wherein the load balancing module is further configured to adjust the allocation information based on the received block acknowledgement to generate adjusted allocation information.

In Example 4, the subject matter of Example 3, wherein the block acknowledgement module is further configured to reallocate one or more of the data frames and corresponding sequence numbers to a different one of the first and the second aggregation and transmission modules based on the adjusted allocation information.

In Example 5, the subject matter of Example 1, wherein at least one of the channel quality information of first communication protocol and the channel quality information of the second communication comprises one or more of: transmission channel load of a corresponding one of the first and second communication protocols; transmission channel accessibility of the corresponding one of the first and second communication protocols; and transmission channel link quality of the corresponding one of the first and second communication protocols.

In Example 6, the subject matter of Example 1, wherein the allocation information comprises: a first percentage of the data frames to be allocated to the first communication protocol; and a second percentage of the data frames to be allocated to the second communication protocol.

In Example 7, the subject matter of any of Examples 1-6, further comprising: a first radio frequency (RF) circuit that includes the first aggregation and transmission module, the first RF circuit being configured to transmit the data frames allocated to the first aggregation and transmission module; and a second RF circuit that includes the second aggregation and transmission module, the second RF circuit being configured to transmit the data frames allocated to the second aggregation and transmission module.

In Example 8, the subject matter of any of Examples 1-6, wherein the data frames are Media Access Control Protocol Data Units (MPDUs).

In Example 9, the subject matter of any of Examples 1-6, wherein the first communication protocol is operable on a 60 GHz frequency band and the second communication protocol is operable on one or more of a 2.4 GHz frequency band and a 5 GHz frequency band.

Example 10 is a communication method of a communication device operable to communicate using first and second communication protocols, comprising: calculating channel quality information for each of the first and the second communication protocols; generating allocation information of the first and the second communication protocols based on the corresponding channel quality information; generating sequence numbers of corresponding data frames; and allocating the data frames and corresponding sequence numbers for transmission on the first and the second communication protocols based on the allocation information.

In Example 11, the subject matter of Example 10, further comprising: receiving a block acknowledgement that acknowledges which of the data frames have been successfully transmitted to another communication device.

In Example 12, the subject matter of Example 11, further comprising: adjusting the allocation information based on the received block acknowledgement to generate adjusted allocation information.

In Example 13, the subject matter of Example 12, further comprising: reallocating one or more of the data frames and corresponding sequence numbers to a different one of the first and the second communication protocols based on the adjusted allocation information.

In Example 14, the subject matter of Example 10, wherein at least one of the channel quality information of first communication protocol and the channel quality information of the second communication comprises one or more of: transmission channel load of a corresponding one of the first and second communication protocols; transmission channel accessibility of the corresponding one of the first and second communication protocols; and transmission channel link quality of the corresponding one of the first and second communication protocols.

In Example 15, the subject matter of Example 10, wherein the allocation information comprises: a first percentage of the data frames to be allocated to the first communication protocol; and a second percentage of the data frames to be allocated to the second communication protocol.

In Example 16, the subject matter of Example 10, further comprising: transmitting, using a first radio frequency (RF) circuit, the data frames allocated to the first communication protocol; and transmitting, using a second RF circuit, the data frames allocated to the second communication protocol.

In Example 17, the subject matter of Example 10, wherein the data frames are Media Access Control Protocol Data Units (MPDUs).

In Example 18, the subject matter of Example 10, wherein the first communication protocol is operable on a 60 GHz frequency band and the second communication protocol is operable on one or more of a 2.4 GHz frequency band and a 5 GHz frequency band.

In Example 19, the subject matter of Example 10, further comprising: performing a handshake with another communication device to determine: aggregation capabilities of the other communication device; and whether the other communication device will use aggregation operations for communications with the communication device.

Example 20 is a communication device operable to communicate using first and second communication protocols, comprising: a first block acknowledgement generator configured to: generate a first bitmap based on first data frames and corresponding first sequence numbers having been transmitted via the first communication protocol to the communication device; generate a first block acknowledgement based on the first bitmap, the first block acknowledgment being indicative of which of the first data frames have been successfully received by the communication device; a second block acknowledgement generator configured to: generate a second bitmap based on second data frames and corresponding second sequence numbers having been transmitted via the second communication protocol to the communication device; generate a second block acknowledgement based on the second bitmap, the second block acknowledgment being indicative of which of the second data frames transmitted via the second protocol have been successfully received by the communication device; and reordering buffer module configured to: receive, from the first block acknowledgment generator, the first data frames having been successfully received by the communication device via the first protocol; receive, from the second block acknowledgment generator, the second data frames having been successfully received by the communication device via the second protocol; reorder the first and second data frames having been received by the communication device based on the respective first and second sequence numbers.

In Example 21, the subject matter of Example 20, wherein: the first block acknowledgment generator is further configured to transmit the first block acknowledgment to another communication device having transmitted the first data frames; and the second block acknowledgment generator is further configured to transmit the second block acknowledgment to the other communication device having transmitted the second data frames.

In Example 22, the subject matter of any of Examples 20-21, wherein the reordering buffer module is further configured to: release the reordered first and second data frames based on the first and second sequence numbers.

Example 23 is a non-transitory computer-readable storage medium with an executable program stored thereon, wherein the program instructs a processor to perform the method as claimed in any of claims 10-19.

Example 24 is an apparatus comprising means to perform the method as claimed in any of claims 10-19.

Example 25 is an apparatus substantially as shown and described.

Example 26 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to the 802.11 protocols (e.g., Wi-Fi and WiGig), and can be applied to other wireless protocols, including (but not limited to) Bluetooth, Near-field Communication (NFC) (ISO/IEC 18092), ZigBee (IEEE 802.15.4), Radio-frequency identification (RFID), and/or other wireless protocols as would be understood by one of ordinary skill in the relevant arts. Further, exemplary aspects are not limited to the above wireless protocols and can be used or implemented in one or more wired networks using one or more well-known wired specifications and/or protocols.

What is claimed is:

1. A communication device operable to communicate using first and second communication protocols, comprising:
   a load balancing module configured to:
      calculate channel quality information for each of the first and the second communication protocols; and
      generate allocation information of the first and the second communication protocols based on the corresponding channel quality information; and
   a block acknowledgement module configured to:
      generate sequence numbers of corresponding data frames;

allocate the sequence numbers, based on the allocation information, to the first and the second communication protocols;

provide the data frames, based on the allocation of the sequence numbers, to first and second aggregation and transmission modules corresponding to the first and the second communication protocols.

2. The communication device of claim 1, wherein the load balancing module is further configured to receive a block acknowledgement that acknowledges which of the data frames have been successfully transmitted to another communication device.

3. The communication device of claim 2, wherein the load balancing module is further configured to adjust the allocation information based on the received block acknowledgement to generate adjusted allocation information.

4. The communication device of claim 3, wherein the block acknowledgement module is further configured to reallocate one or more of the data frames and corresponding sequence numbers to a different one of the first and the second aggregation and transmission modules based on the adjusted allocation information.

5. The communication device of claim 1, wherein at least one of the channel quality information of first communication protocol and the channel quality information of the second communication comprises one or more of:
transmission channel load of a corresponding one of the first and second communication protocols;
transmission channel accessibility of the corresponding one of the first and second communication protocols; and
transmission channel link quality of the corresponding one of the first and second communication protocols.

6. The communication device of claim 1, wherein the allocation information comprises:
a first percentage of the data frames to be allocated to the first communication protocol; and
a second percentage of the data frames to be allocated to the second communication protocol.

7. The communication device of claim 1, further comprising:
a first radio frequency (RF) circuit that includes the first aggregation and transmission module, the first RF circuit being configured to transmit the data frames allocated to the first aggregation and transmission module; and
a second RF circuit that includes the second aggregation and transmission module, the second RF circuit being configured to transmit the data frames allocated to the second aggregation and transmission module.

8. The communication device of claim 1, wherein the data frames are Media Access Control Protocol Data Units (MPDUs).

9. The communication device of claim 1, wherein the first communication protocol is operable on a 60 GHz frequency band and the second communication protocol is operable on one or more of a 2.4 GHz frequency band and a 5 GHz frequency band.

10. A communication method of a communication device operable to communicate using first and second communication protocols, comprising:
calculating channel quality information for each of the first and second communication protocols;
generating allocation information of the first and the second communication protocols based on the corresponding channel quality information;
generating sequence numbers of corresponding data frames;
allocating the sequence numbers, based on the allocation information, to the first and the second communication protocols;
providing the data frames, based on the allocation of the sequence numbers for transmission on the first and the second communication protocols.

11. The communication method of claim 10, further comprising:
receiving a block acknowledgement that acknowledges which of the data frames have been successfully transmitted to another communication device.

12. The communication method of claim 11, further comprising:
adjusting the allocation information based on the received block acknowledgement to generate adjusted allocation information.

13. The communication method of claim 12, further comprising:
reallocating one or more of the data frames and corresponding sequence numbers to a different one of the first and the second communication protocols based on the adjusted allocation information.

14. The communication method of claim 10, wherein at least one of the channel quality information of first communication protocol and the channel quality information of the second communication comprises one or more of:
transmission channel load of a corresponding one of the first and second communication protocols;
transmission channel accessibility of the corresponding one of the first and second communication protocols; and
transmission channel link quality of the corresponding one of the first and second communication protocols.

15. The communication method of claim 10, wherein the allocation information comprises:
a first percentage of the data frames to be allocated to the first communication protocol; and
a second percentage of the data frames to be allocated to the second communication protocol.

16. The communication method of claim 10, further comprising:
transmitting, using a first radio frequency (RF) circuit, the data frames allocated to the first communication protocol; and
transmitting, using a second RF circuit, the data frames allocated to the second communication protocol.

17. The communication method of claim 10, wherein the data frames are Media Access Control Protocol Data Units (MPDUs).

18. The communication method of claim 10, wherein the first communication protocol is operable on a 60 GHz frequency band and the second communication protocol is operable on one or more of a 2.4 GHz frequency band and a 5 GHz frequency band.

19. The communication method of claim 10, further comprising:
performing a handshake with another communication device to determine:
aggregation capabilities of the other communication device; and
whether the other communication device will use aggregation operations for communications with the communication device.

20. A communication device operable to communicate using first and second communication protocols, comprising:
- a first block acknowledgement generator configured to:
  - generate a first bitmap based on first data frames and corresponding first sequence numbers having been integrated into a first aggregated data frame transmitted via the first communication protocol to the communication device, the first bitmap having a sequence of bits respectively corresponding to the sequence numbers having been transmitted via the first communication protocol in the first aggregated data frame;
  - generate a first block acknowledgement based on the first bitmap, the respective bit values of the sequence of bits of the first bitmap being indicative of which of the first data frames have been successfully received by the communication device;
- a second block acknowledgement generator configured to:
  - generate a second bitmap based on second data frames and corresponding second sequence numbers having been integrated into a second aggregated data frame transmitted via the second communication protocol to the communication device, the second bitmap having a sequence of bits respectively corresponding to the sequence numbers having been transmitted via the second communication protocol in the second aggregated data frame;
  - generate a second block acknowledgement based on the second bitmap, the respective bit values of the sequence of bits of the second bitmap being indicative of which of the second data frames transmitted via the second protocol have been successfully received by the communication device; and
- reordering buffer module configured to:
  - receive, from the first block acknowledgment generator, the first data frames having been successfully received by the communication device via the first protocol;
  - receive, from the second block acknowledgment generator, the second data frames having been successfully received by the communication device via the second protocol;
  - reorder the first and second data frames having been received by the communication device based on the respective first and second sequence numbers.

21. The communication device of claim 20, wherein:
the first block acknowledgment generator is further configured to transmit the first block acknowledgment to another communication device having transmitted the first data frames; and
the second block acknowledgment generator is further configured to transmit the second block acknowledgment to the other communication device having transmitted the second data frames.

22. The communication device of claim 20, wherein the reordering buffer module is further configured to:
release the reordered first and second data frames based on the first and second sequence numbers.

23. A non-transitory computer-readable storage medium with an executable program stored thereon, wherein the program instructs a processor to perform the method as claimed in claim 10.

* * * * *